United States Patent [19]
Hale et al.

[11] Patent Number: 5,870,689
[45] Date of Patent: Feb. 9, 1999

[54] SCOUTING SYSTEM FOR AN AGRICULTURAL FIELD

[75] Inventors: George H. Hale, Naperville; Keith W. Wendte, Lemont, both of Ill.

[73] Assignee: Case Corporation, Racine, Wis.

[21] Appl. No.: 755,278

[22] Filed: Nov. 22, 1996

[51] Int. Cl.[6] .................................................... G06F 19/00
[52] U.S. Cl. ............................................................. 702/5
[58] Field of Search ....................... 702/2, 3, 5; 701/210, 701/214, 216, 221; 460/1, 8; 56/10.2 R, 10.2 A, 10.2 G

[56] References Cited

U.S. PATENT DOCUMENTS

| | | |
|---|---|---|
| Re. 35,100 | 11/1995 | Monson et al. . |
| 4,578,678 | 3/1986 | Hurd . |
| 4,630,773 | 12/1986 | Ortlip . |
| 4,675,676 | 6/1987 | Takanabe et al. . |
| 4,736,303 | 4/1988 | Itoh et al. . |
| 4,792,907 | 12/1988 | Ikeda et al. . |
| 4,949,268 | 8/1990 | Nishikawa et al. . |
| 5,050,771 | 9/1991 | Hanson et al. ............................. 222/1 |
| 5,084,822 | 1/1992 | Hayami . |
| 5,214,757 | 5/1993 | Mauney et al. . |
| 5,220,509 | 6/1993 | Takemura et al. . |
| 5,282,389 | 2/1994 | Faivre et al. . |
| 5,396,431 | 3/1995 | Shimizu et al. . |
| 5,398,034 | 3/1995 | Spilker, Jr. . |
| 5,416,712 | 5/1995 | Geier et al. . |
| 5,421,416 | 6/1995 | Orbach et al. . |
| 5,428,544 | 6/1995 | Shyu . |
| 5,440,484 | 8/1995 | Kao . |
| 5,452,211 | 9/1995 | Kyrtsos et al. . |
| 5,455,769 | 10/1995 | Panoushek et al. . |
| 5,467,271 | 11/1995 | Abel et al. . |

(List continued on next page.)

FOREIGN PATENT DOCUMENTS

| | | |
|---|---|---|
| 0282639 A2 | 9/1988 | European Pat. Off. . |
| 0723740 A1 | 7/1996 | European Pat. Off. . |
| 4318798 A1 | 6/1994 | Germany . |
| WO 95/02220 | 1/1995 | WIPO . |
| WO 97/09696 | 3/1997 | WIPO . |

OTHER PUBLICATIONS

PCT Form/ISA/220, International Search Report for Application, PCT/US97/21035; Apr. 20, 1998.

Brochure: *Advanced Farming Systems,* ®1996 Case Corporation.

Brochure: *John Deere Greenstar Combine Yield–Mapping System,* John Deers (No Date).

Report No. 94–D–139, *Site Specific Yield Measurement in Combines and Forage Harvesting Machines, Ageng*—Milano '94.

*The Use of GPS in Agriculture for Yield Mapping and Tractor Implement Guidance,* DGPS '91 Symposium, vol. II, Seite 455–465.

(List continued on next page.)

*Primary Examiner*—Donald E. McElheny, Jr.
*Attorney, Agent, or Firm*—Foley & Lardner

[57] ABSTRACT

A site-specific farming system for performing work on an agricultural field while the field is being scouted is disclosed herein. The system includes a vehicle such as a combine or tractor equipped with a tool for working the field such as a header or variable-rate applicator. A sensing circuit detects a site-specific characteristic of the field such as crop yield harvested from the field or fertilizer applied to the field. An input device is used to mark the positions of visible elements associated with the field. A location signal generation circuit generates signals relating to the locations at which the characteristic is sampled and to the positions of the visible elements. Characteristic data is correlated with the locations at which the characteristic was sampled, and scouting data representative of the visible elements is correlated with the positions of the visible elements. The correlated data is stored in a memory. The input device may include re-definable switches. A display may show a field map including characteristic values, visible elements and definitions of the re-definable switches.

21 Claims, 7 Drawing Sheets

U.S. PATENT DOCUMENTS

| | | |
|---|---|---|
| 5,469,158 | 11/1995 | Morita . |
| 5,487,702 | 1/1996 | Campbell et al. ............................ 460/7 |
| 5,490,073 | 2/1996 | Kyrtsos . |
| 5,497,149 | 3/1996 | Fast . |
| 5,510,798 | 4/1996 | Bauer . |
| 5,517,419 | 5/1996 | Lanckton et al. . |
| 5,523,765 | 6/1996 | Ichikawa . |
| 5,525,998 | 6/1996 | Geier . |
| 5,526,002 | 6/1996 | Gudat et al. . |
| 5,526,291 | 6/1996 | Lennen . |
| 5,686,671 | 11/1997 | Nelson et al. ......................... 73/861.73 |
| 5,699,244 | 12/1997 | Clark, Jr. et al. ............................ 702/2 |

OTHER PUBLICATIONS

*Yield Monitoring Experiences*—1994, ASAE Winter Meeting, Atlanta GA, Dec. 16, 1994.

*Six–Ply Precision Layers of Computerized Information Allow Fine–Tuned Crop Production,* Top Producer/Jan. 1995.

*Farming with Satellites the Future of Farming?*, FarmWeek, p. 3, Monday, Feb. 24, 1992.

*Field Positioning Technology,* Soybean Digest, HighTech Tools, pp. 23–25, Winter 1992.

*Tools with Eyes,* Farm Journal / Mid–Mar., 1989.

*Data Acquistion for Yield Mapping with Combine Harvesters* Computers in Agriculture, ASAE 1994.

*Accuracy from Afar,* Top Producer / Feb. 1992.

*Accuracy to the Inch,* Top Producer / Jan. 1995.

*Sensing and Mapping Grain Yield Variation,* Automated Agriculture for the $21^{st}$ Century, ASAE Pub. 11–91.

*Robotics and Intelligent Machines in Agriculture in Agriculture,* ASAE—Proceedings—the First International Conference on Robotics . . . —Oct. 2–4, 1983.

*Control Concepts for Tillage Systems*—Robert L. Schafer—Dec. 1981.

*Control System for Combine Harvesters*—Report by Kotyk et al. (no date).

Brochure: *Introducing the Greenstar Combine Yeild–Mapping System* (What is the Greenstar Combine Yield–Mapping System?) (no date).

Brochure: *Hiniker 8150 Control System—The Simple and Economical Solution to Accurate Chemical and Fertilizer Application.*

Brochure: *Hiniker 8200 Monitor—The Most Versatile Low Cost Acre Monitor on the Market.*

*Site Specific Farming's Second Wave*—Bryce Knorr; Mar. 1995.

3rd International Conference on *Land Vehicle Navigation*—Prof. Dr. Kurt Biedonkopf; 14–16 Jun. 1994.

*Data Acquisition for Yield Mapping with Combine Harvesters*—P. Reitz and H.D. Kutzbach.

*Global Positioning System Applications*—Al Demmler; Apr. 1994.

*Where in the World?*—Ron Harbour: AgMapping Jun. 1991.

| DATA POINT NO. | BU /ACRE | MOISTURE | LONGITUDE | LATITUDE | ... |
|---|---|---|---|---|---|
| 1 | 32.0739 | 17.7 | −88.7291520 | 39.0710720 | |
| 2 | 56.5808 | 18.1 | −88.7291140 | 39.0710720 | |
| 3 | 64.1104 | 17.1 | −88.7290720 | 39.0710740 | |
| 4 | 96.1741 | 16.4 | −88.7290320 | 39.0710760 | |
| 5 | 105.247 | 15.9 | −88.7289890 | 39.0710740 | |
| . | . | . | . | . | |
| . | . | . | . | . | |
| . | . | . | . | . | |

300

SCOUTING SYSTEM FOR AN AGRICULTURAL FIELD

FIELD OF THE INVENTION

The present invention relates to a system for scouting an agricultural field for different types of visible elements such as rocks, weed infestation, insect infestation, wet spots and grass. In particular, the invention relates to a site-specific farming system mounted on an agricultural vehicle for scouting an agricultural field while the field is being worked.

BACKGROUND OF THE INVENTION

Research within the agricultural community has shown that management of crop production may be optimized by taking into account spatial variations that often exist within a given farming field. For example, by varying the farming inputs applied to a field according to local conditions within the field, a farmer can optimize crop yield as a function of the inputs being applied while preventing or minimizing environmental damage. This management technique has become known as precision, site-specific, prescription or spatially-variable farming.

The management of a field using precision farming techniques requires the gathering and processing of data relating to site-specific characteristics of the field. Generally, site-specific input data is analyzed in real-time or off-line to generate a prescription map including desired application or control rates of a farming input. A control system reads data from the prescription map and generates a control signal which is applied to a variable-rate controller for applying a farming input to the field at a rate that varies as a function of the location. Variable-rate controllers may be mounted on agricultural vehicles with attached variable-rate applicators, and may be used to control application rates for applying seed, fertilizer, insecticide, herbicide or other inputs. The effect of the inputs may be analyzed by gathering site-specific yield and moisture content data and correlating this data with the farming inputs, thereby allowing a user to optimize the amounts and combinations of farming inputs applied to the field.

The spatially-variable characteristic data may be obtained by manual measuring, remote sensing, or sensing during field operations. Manual measurements typically involve taking a soil probe and analyzing the soil in a laboratory to determine nutrient data or soil condition data such as soil type or soil classification. Taking manual measurements, however, is labor intensive and, due to high sampling costs, provides only a limited number of data samples. Remote sensing may include taking aerial photographs or generating spectral images or maps from airborne or spaceborne multispectral sensors. Spectral data from remote sensing, however, is often difficult to correlate with a precise location in a field or with a specific quantifiable characteristic of the field. Both manual measurements and remote sensing require a user to conduct an airborne or ground-based survey of the field apart from normal field operations.

Spatially-variable characteristic data may also be acquired during normal field operations using appropriate sensors supported by a combine, tractor or other vehicle. A variety of characteristics may be sensed including soil properties (e.g., organic matter, fertility, nutrients, moisture content, compaction, topography or altitude), crop properties (e.g., height, moisture content or yield), and farming inputs applied to the field (e.g., fertilizers, herbicides, insecticides, seeds, cultural practices or tillage parameters and techniques used). As these examples show, characteristics which correlate to a specific location include data related to local conditions of the field, farming inputs applied to the field, and crops harvested from the field.

Certain types of site-specific data may be gathered visually when a farmer traverses a field during scouting operations. Visual features which may be logged while scouting include rocks, weed or insect infestation, wet spots, grass, landmarks such as utility poles, topography features, points along the boundary of the field, and areas of crop that have an unusual appearance (e.g., an area of corn having unusually large ears or small ears). These features or traits of the field are referred to herein as visible elements.

Scouting may be accomplished in several ways. A farmer may walk or drive a vehicle through a field while the positions of visible elements in the field are manually recorded. Positions of visible elements may be determined by reference to a map of the field, or from an electronic positioning unit. This technique, however, produces data which is difficult to integrate into an electronic site-specific farming system since the recorded data must be manually transferred to a site-specific farming database.

Scouting could be performed using a mapping system which correlates position data received by an electronic positioning unit with visible element data manually entered into the mapping system. The system could automatically store the correlated position data and element data into a site-specific database. Such a system, however, would be disadvantageous because it would require scouting to be performed separately from working the field. Performing scouting separately from harvesting the field or applying farming inputs to the field wastes time, increases fuel costs, increases wear and tear on the vehicle used for scouting, and prevents marking the positions of elements visible or noticed only when the field is being worked.

SUMMARY OF THE INVENTION

Accordingly, the invention provides a site-specific farming system for performing work on an agricultural field while allowing an operator to scout the field for visible elements. The system may be mounted on a combine while the field is being harvested, on a tractor while farming inputs are being applied to the field, or on other vehicles which support tools for working the field. The system allows an operator to scout a field without adversely affecting work being done on the field. For example, scouting data may be entered and processed without slowing or stopping the harvest of crop or the application of farming inputs. Because the operator is already busy working the field, the system includes an operator interface which minimizes the task of entering scouting data to avoid overloading the operator. The operator interface minimizes the number of input devices by re-defining input devices used for working the field to perform functions associated with scouting, thereby decreasing system cost and vehicle cab complexity. The scouting data is automatically stored in a graphical information system database with the characteristic data, and is easily integrated with other site-specific data.

The invention provides a system for scouting an agricultural field for different types of visible elements while work is being performed on the field. The system includes a vehicle moveable over the field and an agricultural tool supported by the vehicle and configured to perform work on the field as the vehicle moves over the field. The system further includes a sensing circuit supported by the vehicle and configured to generate characteristic signals representative of the work performed by the tool at a plurality of locations within the field, an input device supported by the vehicle and configured to generate scouting signals corresponding to visible elements located at a plurality of positions associated with the field, and a location signal generation circuit supported by the vehicle and configured to receive positioning signals and to generate location signals therefrom. The system also includes a control circuit coupled to the sensing circuit, the input device, and the location signal generation circuit. The control circuit is configured to generate characteristic data representative of the work performed based upon the characteristic signals and to generate scouting data representative of the visible elements based upon the scouting signals, and to process the location signals to generate location data representative of the plurality of locations and to generate position data representative of the plurality of positions. The system further includes a digital memory coupled to the control circuit. The control circuit is further configured to correlate the characteristic data with the respective location data and to correlate the scouting data with the respective position data, and to store the characteristic data with the correlated location data and the scouting data with the correlated position data in the digital memory.

The invention also provides a system for scouting an agricultural field for different types of visible elements while work is being performed on the field by a tool supported by a vehicle moveable over the field. The system includes a sensing circuit supported by the vehicle and configured to generate characteristic signals representative of the work performed by the tool at a plurality of locations within the field, a location signal generation circuit supported by the vehicle and configured to receive positioning signals and to generate location signals therefrom, a digital memory, and a control circuit coupled to the sensing circuit, the location signal generation circuit and the digital memory. The control circuit is configured to generate characteristic data representative of the work performed based upon the characteristic signals, to process the location signals to generate location data representative of the plurality of locations, to correlate the characteristic data with the respective location data and to store the characteristic data with the correlated location data in the digital memory. The system further includes an input device coupled to the control circuit and comprising a first switch and a second switch. The second switch is re-definable between first and second states in response to actuation of the first switch. The second switch is configured in the first state to generate input signals unrelated to scouting and is configured in the second state to generate input signals corresponding to visible elements located at a plurality of positions associated with the field. The control circuit is further configured, when the second switch is in the second state, to generate scouting data representative of the visible elements based upon the input signals, to process the location signals to generate position data representative of the plurality of positions, to correlate the scouting data with the respective position data, and to store the scouting data with the correlated position data in the digital memory.

The invention also provides a system for scouting an agricultural field for different types of visible elements while work is being performed on the field by a tool supported by a vehicle moveable over the field. The system includes sensing means for generating characteristic signals representative of the work performed by the tool at a plurality of locations within the field, input means for generating scouting signals corresponding to visible elements located at a plurality of positions associated with the field, and location means for receiving positioning signals and generating location signals therefrom. The system further includes control means for generating characteristic data representative of the work performed based upon the characteristic signals and scouting data representative of the visible elements based upon the scouting signals, for processing the location signals to generate location data representative of the plurality of locations and position data representative of the plurality of positions, and for correlating the characteristic data with the respective location data and the scouting data with the respective position data. The system further includes memory means for storing the characteristic data with the correlated location data and the scouting data with the correlated position data.

The invention also provides a method of scouting an agricultural field for different types of visible elements while work is being performed on the field by a tool supported by a vehicle moving over the field. The method includes the steps of generating characteristic data representative of work being performed by the tool at a plurality of locations within the field, generating scouting data representative of visible elements located at a plurality of positions associated with the field, receiving positioning signals and generating location signals therefrom, processing the location signals to generate location data representative of the plurality of locations and position data representative of the plurality of positions, correlating the characteristic data with the respective location data and correlating the scouting data with the respective position data, and storing the characteristic data with the correlated location data and storing the scouting data with the correlated position data in a memory.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
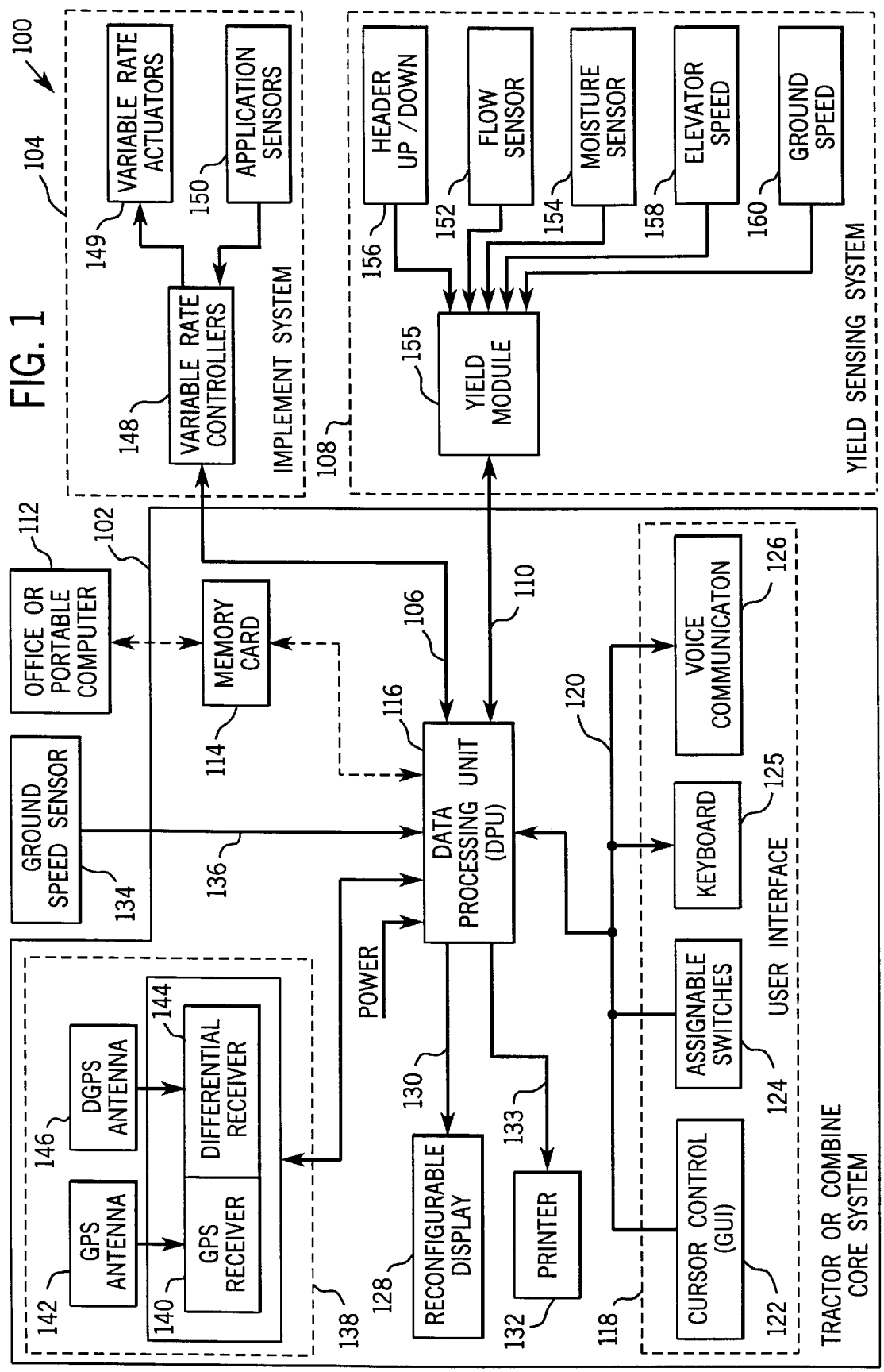
FIG. 1 is a block diagram illustrating a site-specific farming system including vehicles equipped with sensors for sampling site-specific characteristics of a field and electronic displays for displaying visible indicia of the characteristics in the vehicle cabs, and an office or portable computer.

Referring to FIG. 1, a site-specific farming system 100 includes one or more core systems 102 which provide data processing functions for different agricultural vehicles including tractors and combines. In farming system 100, each tractor or combine is equipped with its own core system 102. Each tractor is also equipped with an implement system 104 appropriate for the task at hand, and core system 102 of the tractor communicates with implement system 104 over bus 106. Similarly, each combine is also equipped with a yield sensing system 108, and core system 102 of the combine communicates with yield sensing system 108 over bus 110.

Preferably, core system 102 is removable and can be installed on a variety of agricultural vehicles. When installed on a tractor equipped with implement system 104, core system 102 can be configured to operate in an "apply" mode wherein it collects, controls, records and displays application rate data. The displayed data may include either the desired application rate data (e.g., the prescription map) or the actual application rate data (e.g., the sensed feedback). When installed on a combine equipped with yield sensing system 108, core system 102 can be configured to operate in a "harvest" mode wherein it collects, records and displays harvest data (e.g., yield or moisture content). Core system 102 may also operate in a "scout" mode wherein it records and displays indicia (i.e., graphic symbols) representative of data observed and entered by an operator. Core system 102 may also provide directional or positional assistance during scouting or when collecting soil samples. Sensing and control functions that require specialized input and output processing are performed outside core system 102.

Farming system 100 also includes a workstation or personal computer 112 which may be located in the farm office or may be portable. A medium of communication is used to transfer site-specific data between core system 102 and computer 112. Preferably, core system 102 and computer 112 each include a read/write interface (not shown) for a removable memory card 114 which can be transported between core system 102 and computer 112. Memory cards 114 may be Type II PCMCIA cards made by Centennial Technologies, Inc. However, other mediums of communication (e.g., floppy or hard disk, RF, infrared, RS-232/485 links, etc.) may be used. Memory card 114 is used to transfer site-specific characteristic data from core system 102 to computer 112, and to transfer prescription maps from computer 112 to core system 102.

Core system 102 includes a digital data processing unit (DPU) 116 which communicates with the vehicle operator through a user interface 118 via links 120 (e.g., an RS-232/485 interface; a standard keyboard interface). DPU 116 includes a processor (e.g., a 486DX or Pentium® microprocessor) and various types of memory which may include non-volatile memory (PROM, EEPROM or FLASH) and volatile memory (RAM). The processor executes a program stored in the non-volatile memory and the volatile memory (RAM) may include a battery back-up circuit. Alternatively, DPU 116 may be implemented using dedicated, specific purpose equipment or hard-wired logic circuitry. User interface 118 includes a graphical user interface (GUI) 122 providing cursor control (e.g., a mouse, joystick or four-way switch with up, down, right and left positions), assignable switches 124 (e.g., push buttons) configurable by the processor, a keyboard 125, and a voice-communication interface 126.

DPU 116 is configured to generate display signals which are applied to a reconfigurable display 128 (e.g., a CRT, flat screen LCD display) via communication link 130. Display 128 is preferably an active-matrix LCD capable of displaying full-motion video and a number of colors under varying ambient light conditions. Display 128 is also capable of displaying graphics and alpha-numeric characters. Display 128 is used, inter alia, to display the current configurations of assignable switches 124. DPU 116, user interface 118 and display 128 are located in the vehicle cab such that the operator has easy access to user interface 118 and an unobstructed or substantially unobstructed view of display 128. Core system 102 may also include a printer 132 in the cab which communicates with DPU 116 via an interface 133 (e.g., an RS-232 link).

DPU 116 receives signals representing the speed of the vehicle from ground speed sensor 134 via interface 136 (e.g., a frequency interface). Ground speed sensor 134 may include a magnetic pickup sensor configured to sense the speed of the vehicle's wheels or transmission, or may include a radar device mounted to the body of the vehicle. The speed signals may be used by DPU 116 to calculate distance travelled as described below.

DPU 116 also communicates with a location signal generation circuit 138 which generates location signals representing the vehicle's position. Circuit 138 includes a global positioning system (GPS) signal receiver 140 with an associated antenna 142, and a differential GPS (DGPS) signal receiver 144 with an associated antenna 146. A single antenna may be used in place of antennas 142 and 146. GPS receiver 140 may, for example, be manufactured by Trimble Navigation Ltd. of California, and DGPS receiver 144 may be manufactured by Satloc, Inc. of Arizona. GPS receiver 140 determines longitude and latitude coordinates (and altitude) of the vehicle from signals transmitted by the GPS satellite network. The accuracy of the position data is improved by applying correction signals received by DGPS receiver 144. The differential correction signals are used to correct errors present on GPS signals including the selective availability error signal added to GPS signals by the U.S. government. DGPS correction signals are transmitted by the U.S. Coast Guard and by commercial services. For example, the Omnistar DGPS system from John E. Chance & Assoc. of Texas includes a network of ten land-based differential reference stations which send correction signals to a master station which uploads signals to a satellite for broadcast throughout North America. GPS differential correction signals may also be transmitted from a local base station such as the top of a building. In a preferred embodiment, DPU 116 interfaces with the SATLOC L-Band Integrated TerraStar DGPS System via an RS-485 communication link.

To clarify the description of the scouting function, the term "locations" is used herein to describe places in a field where characteristics of the field are sensed, and the term "positions" is used to describe places in a field where visible elements are located. Location data which represents the "locations" and position data which represents the "positions" are determined using location signals generated by location signal generation circuit 138 from the received positioning signals.

When core system 102 is mounted on a tractor, DPU 116 communicates with implement system 104 via bus 106. Implement system 104 may include one or more variable-rate controllers 148, variable-rate actuators 149 and application sensors 150. DPU 116 reads application rate data for a particular field location from a prescription map (which may be supplied by computer 112), or reads an input device such as a potentiometer (not shown) used to manually set a desired application rate, and generates commands which are sent to variable-rate controllers 148. The command output rate is a function of the speed of the tractor and the desired application rate. For example, an increased speed will require an increased output rate to maintain a constant desired application rate. In response, controllers 148 generate control signals which are applied to variable-rate actuators 149. Application sensors 150 provide feedback signals representing the actual application rates to enable closed-loop control. Bus 106 may be an RS-485 bus for a single-channel variable-rate controller, or an SAE J-1939 implement bus for a multiple-channel controller.

The tractor may also include site-specific sensors configured to sense characteristics of a field during field operations and communicate the information to DPU 116, even if the tractor is not equipped with variablerate controllers. For example, a tractor pulling a plow may be equipped with sensors for monitoring site-specific characteristics (e.g., draft force; implement position) as a field is worked. A tractor with a hitch assembly control system with various sensors is described in U.S. Pat. No. 5,421,416, commonly assigned and incorporated herein by reference. A tractor, as used herein, includes various agricultural vehicles attached to implements such as planters, spreaders or fertilizers.

Desired application rate signals from a prescription map, actual application rate signals from feedback sensors 150, or signals from another site-specific sensor supported by the tractor are processed by DPU 116 to form data representative of the respective characteristic. This characteristic data is correlated with location data representative of the location signals received from location signal generation circuit 138 and the correlated data is stored in memory card 114 or in another memory.

When core system 102 is mounted on a combine, DPU 116 communicates with yield sensing system 108 via link 110, which may carry RS-232/485 signals. Yield sensing system 108 typically includes a yield flow sensor 152 and a moisture sensor 154. Yield flow sensor 152 may include an impact-type mass flow rate sensor attached to a steel plate which is struck by grain passing through the cleangrain elevator of the combine to measure the force of the grain flow. Moisture sensor 154 may be a capacitive-type sensor mounted on the underside of the grain tank loading auger of the combine to measure the moisture content of grain passing near the sensor. Moisture sensor 154 may include a grain temperature sensor to compensate the grain moisture signals for temperature. DPU 116 receives sensed signals from flow sensor 152 and moisture sensor 154, and receives location signals from location signal generation circuit 138 which represent the locations of the combine where grain flow and moisture content were sampled. The grain flow and moisture content signals are processed to form data representative of the respective characteristic, and this data is correlated with location data representative of the location signals. Correlated data is stored in memory card 114 or in another memory.

To convert the grain flow signals into yield data, the distance travelled by the combine is determined by multiplying the combine's speed by elapsed time. The speed may be based upon signals sensed by speed sensor 134, or may be determined by calculating the difference between successive positioning signals received from location signal generation circuit 138 and dividing by elapsed time. The yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance travelled.

In one embodiment, DPU 116 receives RS-485 serial communication signals from a yield module unit (YMU) 155 which is configured to perform data processing for yield sensing system 108. A separate YMU off-loads data processing functions from DPU 116, and minimizes wiring between the combine and the DPU. YMU 155 receives sensed signals from flow sensor 152, moisture sensor 154, a header up/down sensor 156, an elevator speed sensor 158 and a ground speed sensor 160. Header up/down sensor 156 senses the position of the combine's header to detect whether the combine is harvesting. When header position is above a pre-programmed value, YMU 155 assumes the combine is not harvesting and yield information is not calculated. A system for controlling and displaying the status of a combine header is described in U.S. Pat. No. 5,465,560, commonly assigned and incorporated herein by reference. Elevator speed sensor 158 senses the speed of the clean grain elevator to determine the speed at which grain passes through the elevator. Signals from sensor 158 may be used to compensate the yield calculations for the delay before harvested grain is sensed. Ground speed sensor 160 senses ground speed of the combine, and may be the same as ground speed sensor 134, or similar to it.

YMU 155 uses signals from sensors 152, 154, 156, 158 and 160 to calculate and communicate yield and moisture content data to DPU 116 via bus 110. The update rate at which data is communicated may be once per second. YMU 155 may provide instantaneous yield and moisture content data, and may also provide field and load total (summary) values for grain weight, wet and dry bushels, average moisture, area harvested and dry yield. Thus, YMU 155 allows specific yield processing functions to be moved from DPU 116. Alternatively, YMU 155 may send raw sensed data to DPU 116 and the DPU may perform the calculations. However, farming system 100 could also be configured such that DPU 116 reads the signals directly from the sensors.

Core system 102 may communicate with other vehicle systems over a vehicle data bus (not shown). Preferably, the vehicle data bus conforms to the standards of SAE J-1939 ("Recommended Practice for a Serial Control and Communications Vehicle Network"). A bridge circuit may be used to facilitate the transfer of data between the vehicle data bus and a secondary implement bus coupled to implement system 104 and DPU 116. The bridge circuit may be used to filter data between busses, thereby decreasing bus loading.

Figure 2:
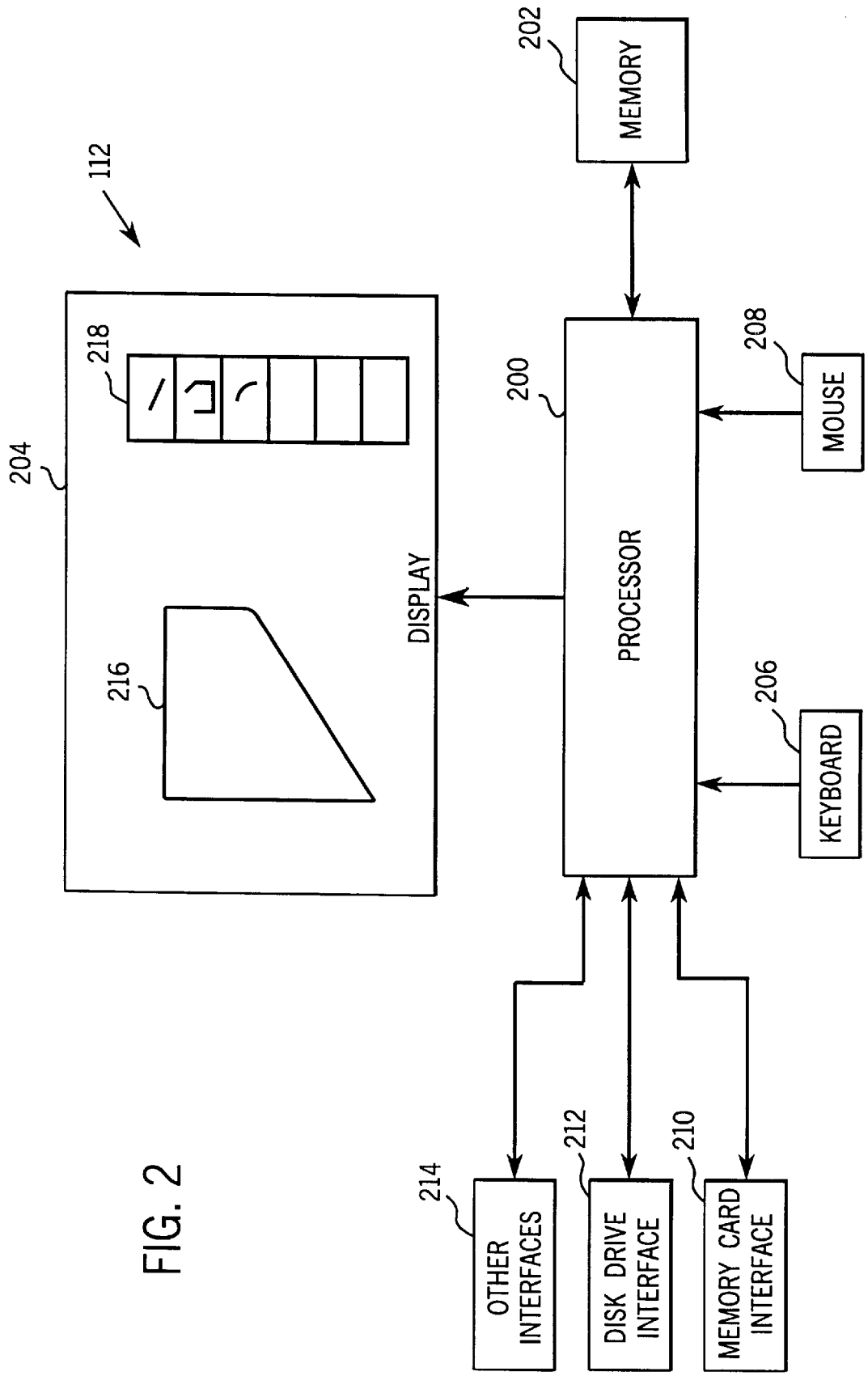
FIG. 2 is a block diagram of the office or portable computer shown in FIG. 1 which can be used to process site-specific farming data.

Referring to FIG. 2, computer 112 is preferably a programmed personal computer including a processor 200, a memory circuit 202, a color or monochrome display 204, input devices such as a keyboard 206 or a mouse 208, and input/output interfaces such as a memory card interface 210, a hard or floppy disk drive interface 212, and other interfaces 214 (e.g., RF or infrared). An input device such as a joystick, light pen or touch screen may also be used. Alternatively, computer 112 may be implemented using dedicated, specific-purpose equipment or hard-wired logic circuitry. Processor 200 may be an x86 or Pentium® microprocessor configured to execute a program stored in memory 202 or on a disk read by disk drive interface 212. Preferably, processor 200 reads precision farming data including position information from memory card 114 using memory card interface 210. Data may also be entered using keyboard 206, mouse 208, disk drive interface 212, or another interface 214.

Processor 200 generates display signals which, when applied to display 204, cause visual alpha-numeric and graphical indicia to be displayed. For example, the display signals may cause display 204 to create a visual map 216 of a field as well as icons 218 representing drawing tools in a toolbox. Preferably, display 204 is a color monitor, but it may also be a monochrome monitor capable of displaying different light intensity levels.

Figure 3:
FIG. 3 represents a layer of data representing a spatially-variable characteristic of a farming field stored in memory.

FIG. 3 generally represents the structure in which a layer of site-specific farming data representative of a characteristic of a farming field is stored in memory. The data structure may be referred to as a geo-referenced digital map, or a layer of data. The structure is preferably implemented using a database 300 (e.g., a geographical information system (GIS) database) represented by a table, wherein each row represents a characteristic data point taken at a location in the field. For example, a layer having 5000 data points is represented by a table having 5000 rows. Columns of information are associated with each data point. For example, the columns shown in FIG. 3 include yield data (bu/acre), moisture content data, and the longitude and latitude coordinates at which each data point was sampled. The data structure of FIG. 3 represents, for example, a yield layer. Data in the first row (Data Point No. 1) indicates that flow sensor 152 and moisture sensor 154 of the combine sensed grain flow corresponding to a yield of 32.0739 bu/acre and a moisture content of 17.7, respectively, at a location defined by longitude and latitude coordinates −88.7291520 and 39.0710720.

A similar structure may be used to store each layer of site-specific farming data. For example, a pH layer may include a row for each data point and columns for pH, longitude and latitude. Thus, memory card 114 may contain a layer of data for each site-specific characteristic of a field.

The data structure represented generally by FIG. 3 may include additional columns representing other spatially-variable data. For example, a harvest data structure may include the following fields:

| Data Item | Description |
| --- | --- |
| Longitude | Longitude position of data from GPS |
| Latitude | Latitude position of data from GPS |
| Flow Rate | Weight (wet) of grain passing by flow sensor 152 every second (e.g., lbs/sec) |
| Moisture | Percent (%) of grain weight which is moisture |
| GPS Time | Time stamp from GPS (sec) |
| Cycles | Seconds covered by the data (e.g., 1, 2 or 3) |
| Distance | Distance (inches) traveled since last data point |
| Swath | Width of cut of the header (inches) |
| Header Pos | 1 = header down; 0 = header up |
| Pass | Number of the pass through a field |
| Grain | Type of grain (e.g., corn) |
| GPS Status | 1 = good (> = 4 satellites); 2 = marginal (3 satellites); 3 = bad (< = 2 satellites) |
| Altitude | Altitude (feet) of data from GPS |

The data structure also includes heading information such as a vehicle identifier, a farm identifier, a field identifier, a load identifier, and a serial number for hardware components of farming system 100 (e.g., a yield module serial number). A similar data structure is used to store application data. The harvest and application data structures are preferably stored as DOS files in memory card 114.

DPU 116 and processor 200 use characteristic data and correlated location data to perform various functions of site-specific farming system 100. For example, DPU 116 or processor 200 use the correlated farming data to generate display signals which cause electronic display 128 or 204, respectively, to plot a map of a field which includes visible indicia of the characteristic data. DPU 116 typically plots the map in real-time as the characteristic and location signals are received from the sensing circuits (e.g., flow sensor 152, moisture sensor 154, application sensors 150) and from location signal generation circuit 138, respectively. However, DPU 116 may also plot a map off-line based upon farming data previously stored in memory. For example, if a harvest operation was stopped in mid-field on a previous day, DPU 116 may generate a yield map based on the previous day's yield data and continue plotting data on the yield map that is collected during the current day's operation. In contrast, processor 200 typically plots the map off-line based upon farming data received from memory card 114.

Figure 4:
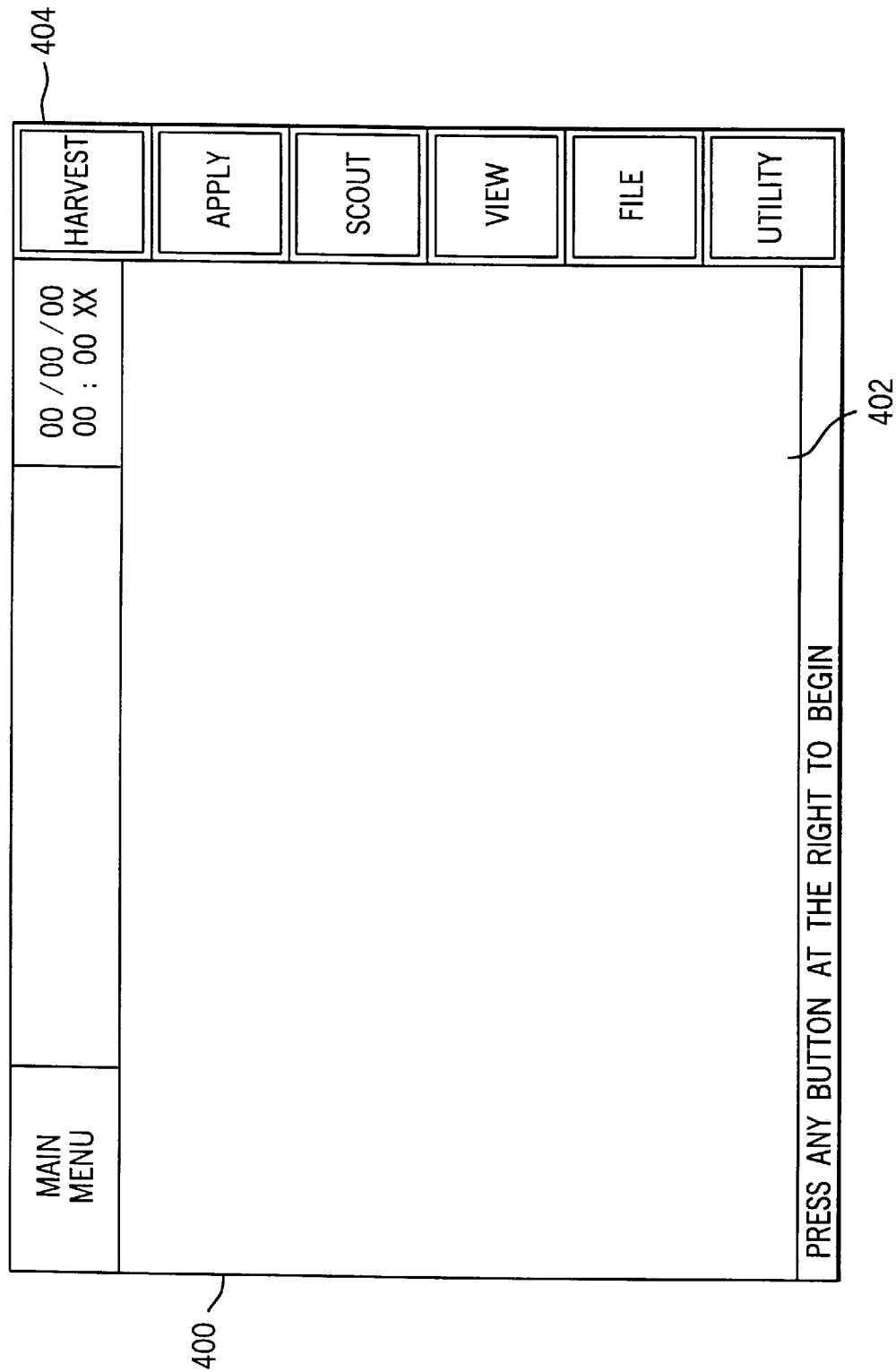
FIG. 4 shows a main menu screen on the electronic display in a vehicle cab shown in FIG. 1 when power is applied to the site-specific farming system.

Site-specific farming system 100 operates in one of several modes selected by the operator. Referring to FIG. 4, DPU 116 generates display signals after power is applied to farming system 100 which cause display 128 to display a main menu screen in the vehicle cab. The screen 400 of display 128 includes a map display area 402 which displays an introductory message (not shown) and a graphical operator interface 404 which shows the initial configuration of assignable switches 124. On power up, the switches are assigned functions which correspond to the operating modes of DPU 116 including HARVEST, APPLY, and SCOUT. DPU 116 reads signals generated in response to operator actuation of one of the switches 124, decodes the signals, and enters the selected mode of operation.

Figure 5:
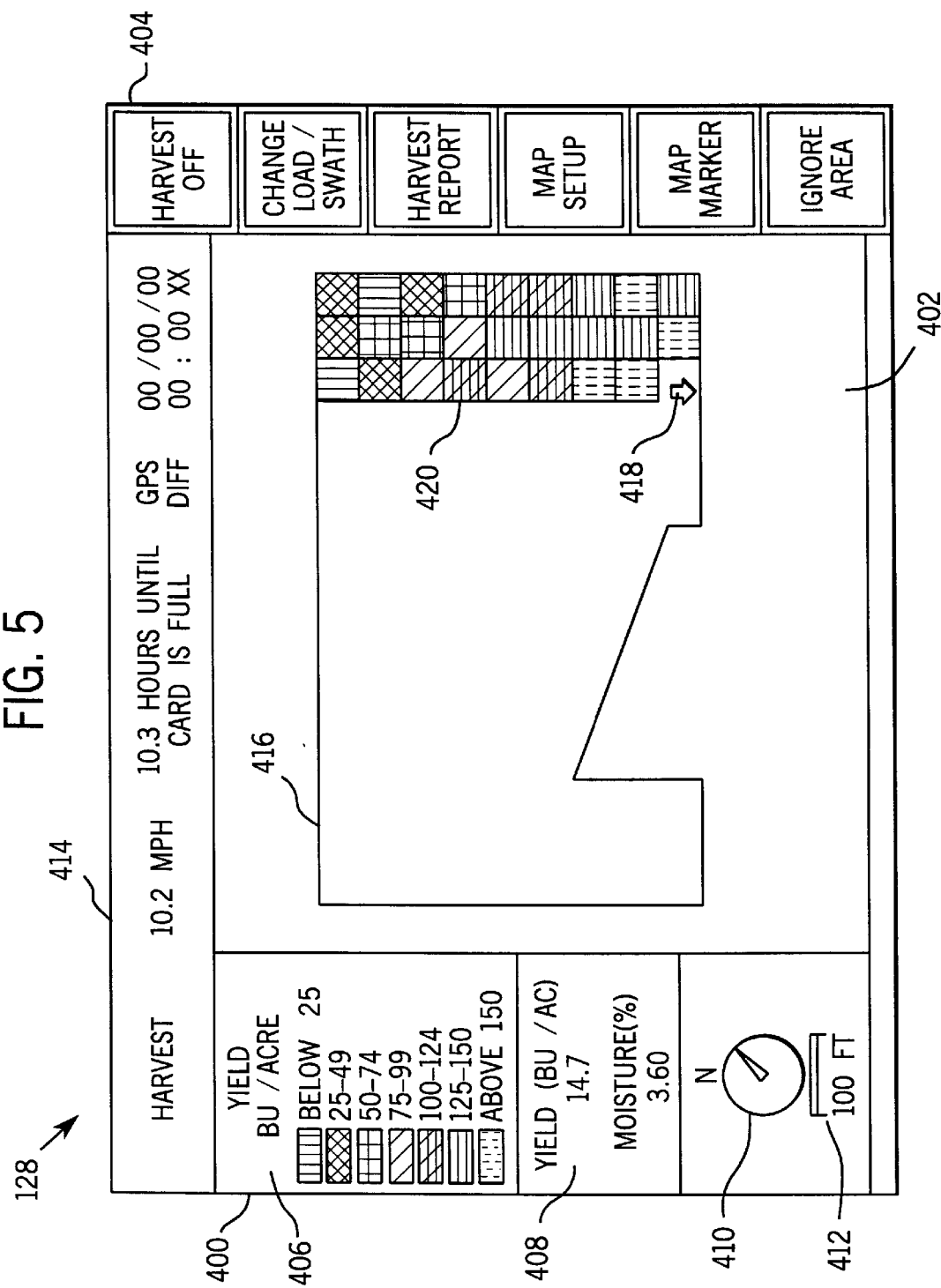
FIG. 5 shows a harvest screen on an electronic display in a vehicle cab which includes a map of a field, visible indicia of a characteristic of the field, and visible indicia showing the definitions of a plurality of re-definable switches when configured for harvesting.

When farming system 100 is in position to harvest a field, the switch 124 corresponding to HARVEST in FIG. 4 is actuated. In response, DPU 116 enters into harvest mode and generates display signals which cause display 128 to show a harvest screen as in FIG. 5. As harvest begins, characteristic data and correlated location data are gathered and used to generate display signals causing display 128 to plot a map of the field in map display area 402 including visible indicia of the characteristic. DPU 116 also changes the configuration of switches 124, and generates display signals causing operator interface 404 to generate visible indicia showing the new states or configurations of switches 124. As shown in FIG. 5, assignable switches 124 have been re-defined to generate input signals which relate to harvesting (e.g., "HARVEST OFF", "CHANGE LOAD/SWATH", "HARVEST REPORT").

The display signals also cause display 128 to show a legend block 406, a status block 408 for displaying statistical data (average yield and moisture content) of the field, a compass indicator 410 to show the heading of the vehicle, a map scale 412, and a status line 414 for displaying status information such as the operating mode ("HARVEST", "APPLY" or "SCOUT"), the vehicle speed, time remaining until memory card 114 is full, GPS and DGPS status (e.g., good or bad) and date/time. The graphical symbols and their positions within screen 400 are shown for illustration only and may be modified. For example, map display area 402 may cover any portion or all of screen 400, with other displayed information superimposed or suppressed if necessary.

FIG. 5 represents an exemplary display when core system 102 is mounted on a combine equipped with yield flow sensor 152 and moisture sensor 154, and the combine is harvesting grain. In this example, the boundaries of the field being harvested are defined and are stored in memory. After entering the harvest mode of operation in response to actuation of one of assignable switches 124, DPU 116 accesses the longitude and latitude coordinates of the field boundary from memory and scales the field boundary to substantially correspond to a portion of map display area 402. DPU 116 scales the boundary data and produces display signals which, when applied to display 128, generate a visible map 416 of the field within the portion of the map display area 402. The portion of map display area 402 which is used to display map 416 may be 80%, 85% or 90% of the size of map display area 402, with the percentage selected to enhance the visual appearance of map 416. However, any percentage value may be used which provides a desirable appearance, including 100%, and the percentage may be set by the user. The scale of map 416 is displayed at map scale 412 (e.g. 100 ft/inch).

At the start of the harvest, the combine was located at the upper-right hand corner of map 416. The combine then made a number of passes through the field, turning at the headlands (located at the boundaries of map 416). The current location of the combine is marked by an icon 418, such as an arrow which also indicates the direction of travel which may be determined from changes in the location data. Other icons may be used (e.g., a drawing of a combine). Throughout harvesting, DPU 116 gathers site-specific data sensed by flow sensor 152 and moisture sensor 154 and correlates the sensed data with the locations at which the sensed data was sampled using signals from location signal generation circuit 138. The data may be sampled, for example, at 1 second intervals. The correlated data is stored in memory (e.g., memory card 114) for later analysis by office computer 112. DPU 116 may be configured to not calculate yield data based upon an indication that the combine is not harvesting (e.g., header position is above a threshold position).

DPU 116 provides an indication of the time remaining before memory card 114 is filled up by yield data during "harvest" mode, or by actual application rate data during "apply" mode when core system 102 is on a tractor. The time remaining equals the amount of memory currently free multiplied by the time since the start of harvesting or application, divided by the difference between the amount of memory free at the start and the amount of memory currently free. The result of the calculation is displayed in status line 414 (e.g., "10.3 Hours Until Card is Full"). Alternatively, DPU 116 may display the portion or percentage of memory card 114 filled up.

DPU 116 may also provide an indication of the estimated time remaining until sampling of the field is complete (i.e., estimated time to complete harvesting or application). The estimated time to complete equals the time since the start of harvesting or application multiplied by the difference between the area of map 416 within the boundaries and the area harvested, divided by the area harvested. The result is displayed on display 128 (e.g., "Estimated Time to Complete is 3.5 Hours"). Alternatively, DPU 116 may display the portion or percentage of the field that has been worked.

To accurately correlate location data with sensed characteristic data, DPU 116 is preferably programmed with variables, which may be set by the operator, which indicate the distance and direction between GPS antenna 142 and the sampled location of the field (i.e., between antenna 142 and the combine's header or the tractor's implement). This information is used as an offset to correct the location data stored with the sensed data. Also, to compensate for the time required for grain entering the header of the combine to reach flow sensor 152, DPU 116 is programmed with a delay value (e.g., 10 seconds). Sensed data is correlated with the location data received 10 seconds earlier. Thus, no data will be sensed and no data will be plotted until 10 seconds after harvesting starts. In one embodiment, DPU 116 maintains a buffer of the last 20 positions received, and selects a position to use based upon the delay value.

The characteristic data and correlated location data are used to produce a display signal in real-time which, when applied to display 128, generates visible indicia of the characteristic data at corresponding locations of map 416. DPU 116 gathers characteristic data over "square" areas of the field where the sides of the square are substantially equal to the width of cut of the combine (or the width of the implement). Other shapes or blocks could also be used such as rectangles where the width is equal to the width of cut and the length is equal to the distance traversed in some time interval. Data within each block is automatically processed or filtered (e.g., averaged). Averaging data as it is plotted eliminates the need to plot every data point, thereby decreasing visual noise on display 128. If desired, the blocks of data could be stored in memory rather than the raw data to reduce the memory storage and subsequent processing requirements. The average value of the data in each block, and location data associated with the block (appropriately scaled), are used to produce the display signal applied to display 128. In response, display 128 generates visible blocks 420 which include visible indicia of the average characteristic value at corresponding locations of map 416.

Characteristic data may be visually represented on display 128 in several ways. In a preferred embodiment, distinguishable colors represent different ranges of the average data in each visible block. For example, the colors red, orange, yellow, green, cyan, blue and violet may represent increasing ranges of average yield. Legend 406 displays each color and its associated yield range: below 25 (red); 25–49 (orange); 50–74 (yellow); 75–99 (green); 100–124 (cyan); 125–150 (blue); and above 150 bu/acre of corn (violet). When a moisture map is displayed, the default colors and ranges are: 0–7% (red); 7–14% (orange); 14–21% (yellow); 21–28% (green); 29–35% (cyan); 35–42% (blue); and above 42% (violet). The ranges and colors could also be selectable by the user.

In one embodiment, the user selects an average value of the characteristic for the field and the ranges are based on the average value, with green centered at the average. For example, each color may represent a yield range of 5 bu/acre if the selected average yield is 50 bu/acre or less, a range of 10 bu/acre if the selected average yield is 50 to 125 bu/acre, or a range of 15 bu/acre if the selected average yield is 125 bu/acre or more. In each case, the range limits are rounded to the next whole number (e.g., green=48–53 bu/acre for a selected average yield of 50 bu/acre), and out of range values are displayed using the appropriate end color (i.e., red or violet). Alternatively, ranges may be represented by alpha-numeric characters or by different light intensity levels or grey scales.

Graphical operator interface 404 includes a label which shows the assignment currently selected for each switch 124. The label and assignment depend on the mode of operation of DPU 116. Indicator 410 is an electronic compass which shows the current direction or heading of the vehicle with respect to north (e.g., northeast in FIG. 5). DPU 116 may calculate the heading based on a vector from the previous location of the vehicle to the current location. Appropriate filtering should be used to keep the compass from changing direction due to GPS errors when the vehicle is not moving. Alternatively, the vehicle may be equipped with a compass or gyroscope electronically interfaced with DPU 116. In FIG. 5, the orientation of the display shows the vehicle going up and down as it travels northeast. However, the orientation of the display could also be geographic (e.g., north up).

In FIG. 5, status line 414 displays "HARVEST" to indicate that DPU 116 is operating in "harvest" mode, and operator interface 404 indicates that assignable or redefinable switches 124 are configured to generate input signals relating to harvesting (e.g., "HARVEST OFF", "CHANGE LOAD/SWATH", "HARVEST REPORT"). However, when core system 102 is mounted on a tractor having variable-rate controllers 148 and is operating in "apply" mode, status line 414 shows "APPLY" and operator interface 404 indicates that re-definable switches 124 are configured to generate input signals relating to application of a farming input (e.g., "APPLY OFF", "MONITOR", "CHANGE RATE"). Work is performed on the field when harvesting the field and when applying a farming input to the field.

Figure 6:
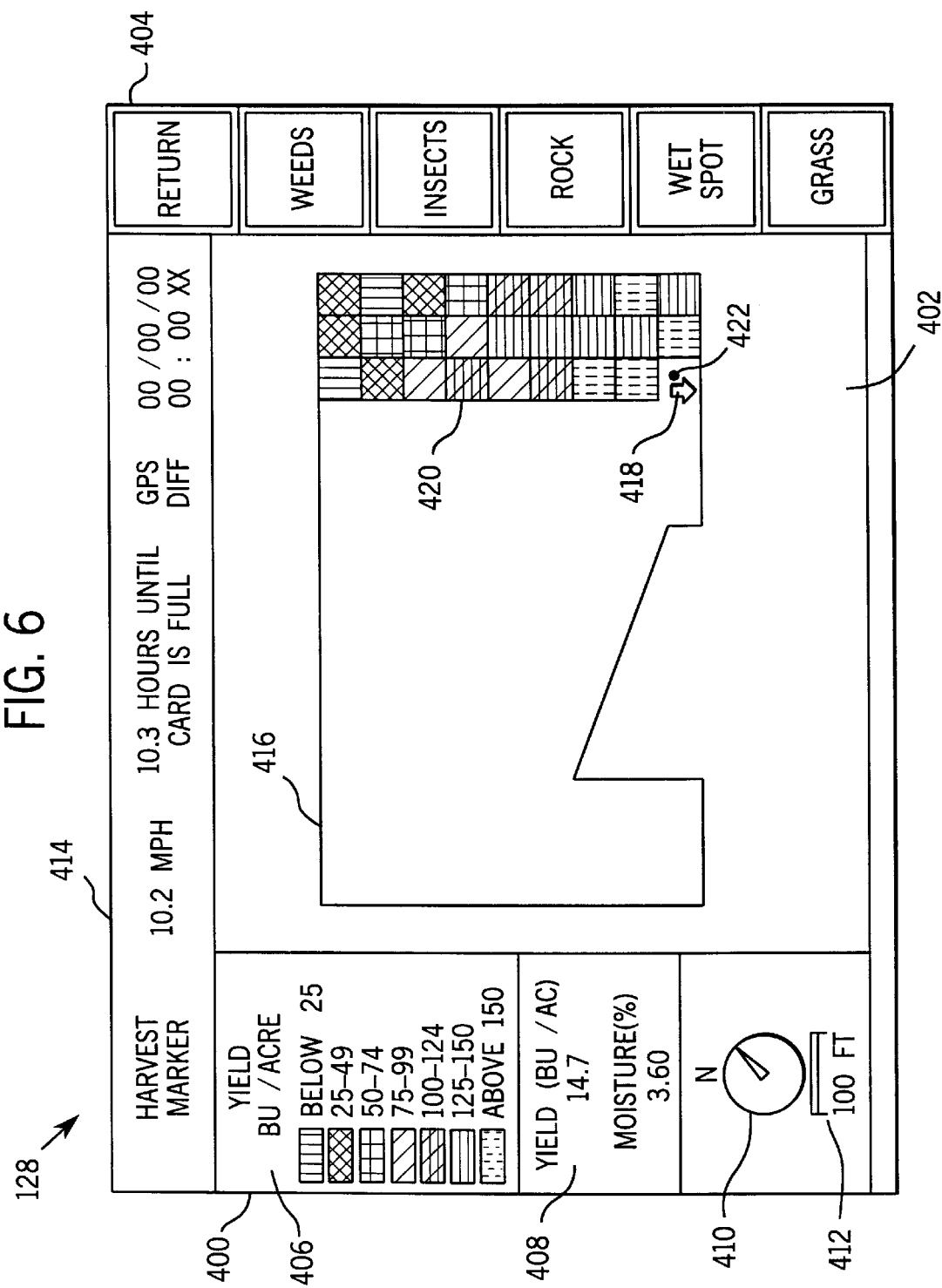
FIG. 6 shows a harvest marker screen on an electronic display in a vehicle cab similar to that of FIG. 5, except that the re-definable switches have been configured to generate scouting signals and the visible indicia showing the definitions of the plurality of re-definable switches show the current configurations.

While working a field, an operator may discover a visible element (e.g., a rock, weed infestation, insect infestation, wet spot, grass, etc.) at a position within the field. To record the element, the re-definable switch defined as "MAP MARKER" in FIG. 5 is actuated, and DPU 116 enters a "HARVEST MARKER" mode. Referring to FIG. 6, upon entering harvest marker mode, DPU 116 continues to collect and process harvest data in the same manner as in harvest mode. However, DPU 116 re-defines switches 124 to relate to scouting functions and generates display signals to modify the labels on display 128 to reflect the revised definitions of switches 124. The revised definitions include "RETURN" (i.e., return to HARVEST mode) and definitions related to elements (e.g., "WEEDS", "INSECTS", "ROCK", "WET SPOT", "GRASS"). Similarly, an "APPLY MARKER" mode is available to record positions of elements discovered during the APPLY mode of operation.

Actuation of a switch 124 assigned to a visible element generates a scouting signal representative of the respective element. For example, actuation of the switch assigned to the "ROCK" element causes the generation of a scouting signal indicating that a rock was found. In response, DPU 116 records scouting data (i.e., a marker) representing the rock in a geo-referenced marker memory layer, and the scouting data is correlated with data representing the position of the rock. A unique marker is used for each type of visible element. Thus, the rock and its position are recorded without interfering with work being performed. A display signal can optionally be generated to cause a marker 422 to be displayed on map 416 at the appropriate position in the field.

Figure 7:
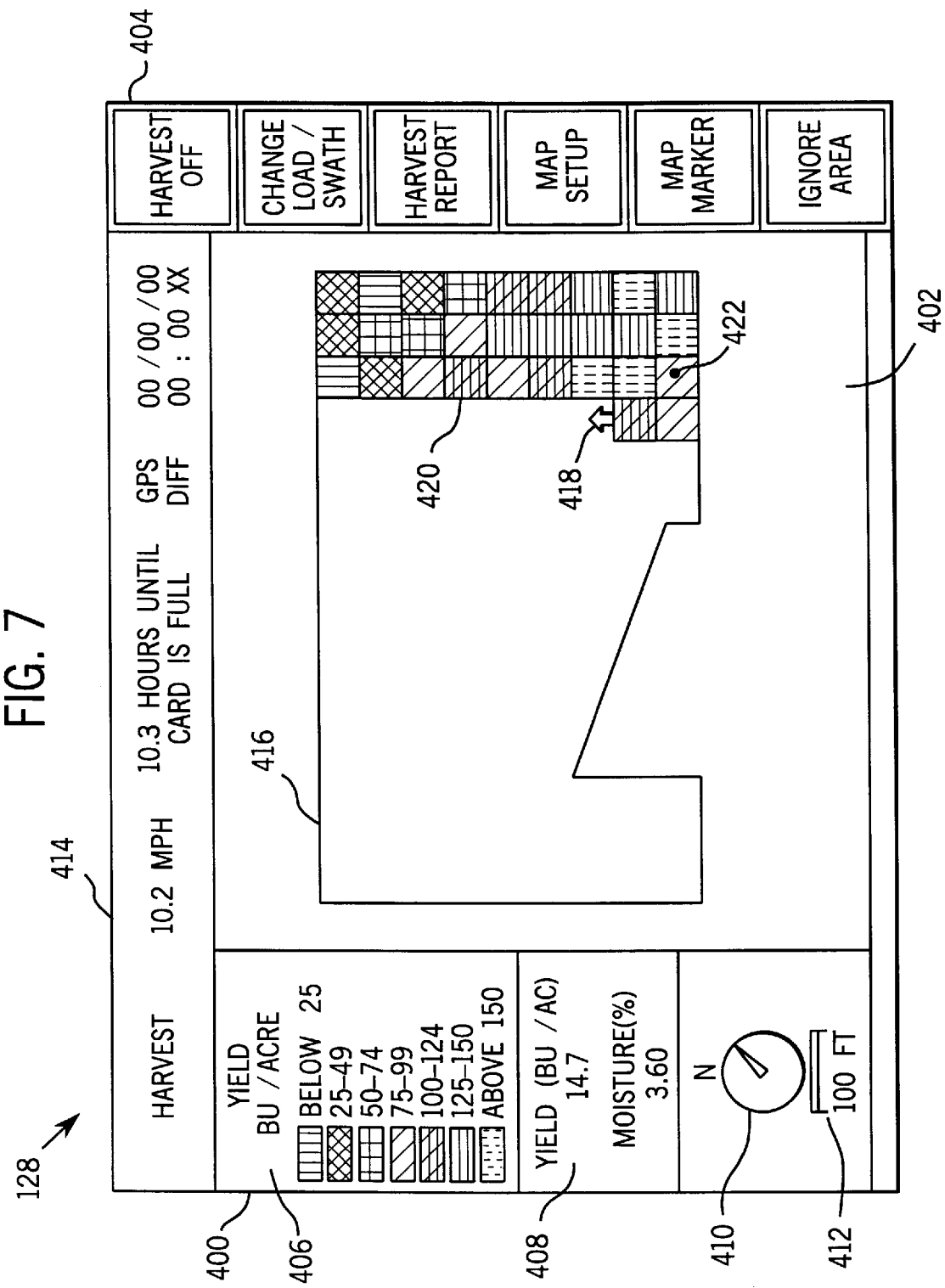
FIG. 7 shows the harvest screen on an electronic display in a vehicle cab similar to that of FIG. 6, except the re-definable switches have been re-configured for harvesting, and more data blocks plus the location of an element (e.g., a rock) in the field have been plotted.

Referring to FIG. 7, the switch 124 assigned to "RETURN" was actuated to cause farming system 100 to return to harvest mode after the rock and its position (and the position of any other visible element) were recorded. After returning, DPU 116 completed collection and processing of data for three more blocks 420, and the vehicle moved to the field location represented by icon 418. DPU 116 re-defined switches 124 and generated display signals to modify the labels for switches 124 to reflect the definitions associated with harvest mode.

Each switch 124 can be defined by DPU 116 as an on-off or momentary switch. In the example above, the "ROCK" switch 124 is configured as a momentary switch which generates signals at points at which rocks are positioned. However, each switch 124 can also be defined as an on-off switch wherein a first actuation represents the starting position of a visible element, and a second actuation represents the ending position of the element. For example, the first actuation of a switch assigned to the "INSECT" element could represent the starting position of an area or line of insect infestation, and the second actuation could represent the ending position. The resulting scouting data could be processed to cause a variable-rate applicator to spray a pesticide over the entire area or line of insect infestation.

Preferably, DPU 116, display 128 and switches 124 are packaged in an integrated assembly such that display 128 provides labels showing assignments of switches 124. However, switches 124 could be housed in a remote marker keyboard external to housing assembly of DPU 116. The remote marker keyboard would include four three-position switches 124 having ON, OFF and momentary positions. The ON and OFF positions would mark the starting and ending points of an element assigned to the switch, and the momentary position would mark the point position of a element. For example, ON and OFF positions of a "ROCK" switch would mark a length of rocks and the momentary position would mark the position of a single rock.

The position data correlated with each visible element is usually the vehicle position when a respective switch 124 is actuated. However, an offset could be applied to the location signals when the position data is generated for elements located at positions away from the vehicle. The offset would represent distance and direction between the vehicle and element, and could be entered by switches 124 and keyboard 125. For example, actuation of a switch 124 could invoke a sub-menu including "HERE" and "OFFSET" functions. The HERE function would indicate that the element is located "here" at the vehicle position such that no offset is needed. In contrast, the OFFSET function would prompt an operator to enter the distance and direction from the vehicle to the element. Thus, elements could be scouted at positions located away from the vehicle position.

While the embodiments illustrated in the FIGURES. and described above are presently preferred, it should be understood that these embodiments are offered by way of example only. For example, voice-communication interface 126 can be used to generate scouting signals instead of switches 124 to further simplify the operator interface by allowing an operator to mark an element by speaking its name (e.g, "rock"). The invention is not intended to be limited to any particular embodiment, but is intended to extend to various modifications that nevertheless fall within the scope of the appended claims.

What is claimed is:

1. A system for scouting an agricultural field for different types of visible elements while work is being performed on the field, comprising:

a vehicle moveable over the field;

an agricultural tool supported by the vehicle and configured to perform work on the field as the vehicle moves over the field;

a sensing circuit supported by the vehicle and configured to generate characteristic signals representative of the work performed by the tool at a plurality of locations within the field;

an input device supported by the vehicle and configured to generate scouting signals corresponding to visible elements located at a plurality of positions associated with the field;

a location signal generation circuit supported by the vehicle and configured to receive positioning signals and to generate location signals therefrom;

a control circuit coupled to the sensing circuit, the input device, and the location signal generation circuit, the control circuit configured to generate characteristic data representative of the work performed based upon the characteristic signals and to generate scouting data representative of the visible elements based upon the scouting signals, and to process the location signals to generate location data representative of the plurality of locations and to generate position data representative of the plurality of positions; and a digital memory coupled to the control circuit, the control circuit further configured to correlate the characteristic data with the respective location data and to correlate the scouting data with the respective position data, and to store the characteristic data with the correlated location data and the scouting data with the correlated position data in the digital memory.

2. The system of claim 1, wherein the vehicle is a combine, the tool is a header configured to harvest the field to generate a flow of grain, the sensing circuit includes a grain flow sensor configured to sense the flow of grain, and the characteristic is yield.

3. The system of claim 1, wherein the vehicle is a tractor, the tool is a variable-rate applicator configured to apply a farming input to the field, the sensing circuit includes an application sensor configured to sense the amount of the farming input applied, and the characteristic is the farming input.

4. The system of claim 1, wherein the location signal generation circuit receives differential global positioning system (DGPS) signals and generates the location signals based on the DGPS signals.

5. The system of claim 1, wherein the location signal generation circuit includes an antenna for receiving the positioning signals, and the control circuit applies an offset signal when generating the location data to correct for the separation between the tool and the antenna.

6. The system of claim 1, wherein the input device includes a momentary switch.

7. The system of claim 1, wherein the input device includes an on-off switch.

8. The system of claim 1, wherein the input device includes a three-position switch having on, off and momentary positions.

9. The system of claim 1, wherein the input device includes at least two switches, each switch configured to correspond to a different type of visible element.

10. The system of claim 9, wherein the type of visible element assigned to each switch is re-definable by the control circuit.

11. The system of claim 10, wherein the type of visible element assigned to each switch is selected from the group consisting of rocks, weed infestation, insect infestation, wet spots and grass.

12. The system of claim 1, wherein the input device includes a voice-recognition interface circuit.

13. The system of claim 1, wherein the input device further generates an offset signal representing the difference between the positions of the vehicle and the visible element, and the control circuit applies the offset signal when generating the position data, thereby allowing scouting of visible elements located at positions away from the vehicle.

14. A system for scouting an agricultural field for different types of visible elements while work is being performed on the field by a tool supported by a vehicle moveable over the field, comprising:

a sensing circuit supported by the vehicle and configured to generate characteristic signals representative of the work performed by the tool at a plurality of locations within the field;

a location signal generation circuit supported by the vehicle and configured to receive positioning signals and to generate location signals therefrom;

a digital memory;

a control circuit coupled to the sensing circuit, the location signal generation circuit and the digital memory, the control circuit configured to generate characteristic data representative of the work performed based upon the characteristic signals, to process the location signals to generate location data representative of the plurality of locations, to correlate the characteristic data with the respective location data and to store the characteristic data with the correlated location data in the digital memory; and an input device coupled to the control circuit and comprising a first switch and a second switch, the second switch being re-definable between first and second states in response to actuation of the first switch, the second switch configured in the first state to generate input signals unrelated to scouting and configured in the second state to generate input signals corresponding to visible elements located at a plurality of positions associated with the field;

wherein the control circuit is configured, when the second switch is in the second state, to generate scouting data representative of the visible elements based upon the input signals, to process the location signals to generate position data representative of the plurality of positions, to correlate the scouting data with the respective position data, and to store the scouting data with the correlated position data in the digital memory.

15. The system of claim 14, wherein the vehicle is a combine, the tool is a header configured to harvest the field to generate a flow of grain, the sensing circuit includes a grain flow sensor configured to sense the flow of grain, and the characteristic is yield.

16. The system of claim 14, wherein the vehicle is a tractor, the tool is a variable-rate applicator configured to apply a farming input to the field, the sensing circuit includes an application sensor configured to sense the amount of the farming input applied, and the characteristic is the farming input.

17. The system of claim 14, wherein the location signal generation circuit receives differential global positioning system (DGPS) signals and generates the location signals based on the DGPS signals.

18. The system of claim 14, wherein the input device further comprises at least a third switch, the third switch being re-definable between first and second states in response to actuation of the first switch, the third switch configured in the first state to generate input signals unrelated to scouting and configured in the second state to generate input signals corresponding to the visible elements located at the plurality of positions, wherein the second and the third switch correspond to different types of visible element.

19. A system for scouting an agricultural field for different types of visible elements while work is being performed on the field by a tool supported by a vehicle moveable over the field, comprising:

sensing means for generating characteristic signals representative of the work performed by the tool at a plurality of locations within the field;

input means for generating scouting signals corresponding to visible elements located at a plurality of positions associated with the field;

location means for receiving positioning signals and generating location signals therefrom;

control means for generating characteristic data representative of the work performed based upon the characteristic signals and scouting data representative of the visible elements based upon the scouting signals, for processing the location signals to generate location data representative of the plurality of locations and position data representative of the plurality of positions, and for correlating the characteristic data with the respective location data and the scouting data with the respective position data; and memory means for storing the characteristic data with the correlated location data and the scouting data with the correlated position data.

20. The system of claim 19, wherein the input means comprises first switch means and second switch means, the second switch means being re-definable between first and second states in response to actuation of the first switch means, the second switch means configured in the first state to generate input signals unrelated to scouting and configured in the second state to generate input signals corresponding to visible elements located at a plurality of positions associated with the field.

21. A method of scouting an agricultural field for different types of visible elements while work is being performed on the field by a tool supported by a vehicle moving over the field, comprising the steps of:

generating characteristic data representative of work being performed by the tool at a plurality of locations within the field;

generating scouting data representative of visible elements located at a plurality of positions associated with the field;

receiving positioning signals and generating location signals therefrom;

processing the location signals to generate location data representative of the plurality of locations and position data representative of the plurality of positions;

correlating the characteristic data with the respective location data and correlating the scouting data with the respective position data; and storing the characteristic data with the correlated location data and storing the scouting data with the correlated position data in a memory.

* * * * *